Jan. 24, 1928.

W. OWEN 1,657,227

APPARATUS FOR MAKING COMPOSITE GLASS

Filed March 10, 1927     5 Sheets-Sheet 4

INVENTOR
Wm Owen
by
James C Bradley
atty

Jan. 24, 1928.
W. OWEN
1,657,227
APPARATUS FOR MAKING COMPOSITE GLASS
Filed March 10, 1927    5 Sheets-Sheet 5
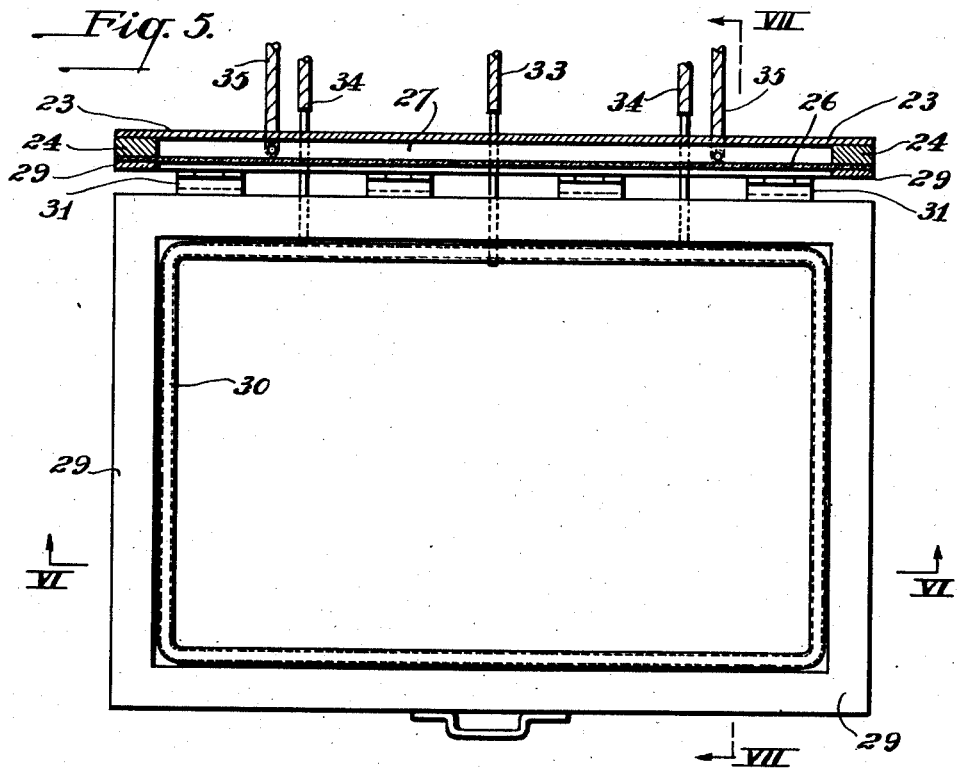
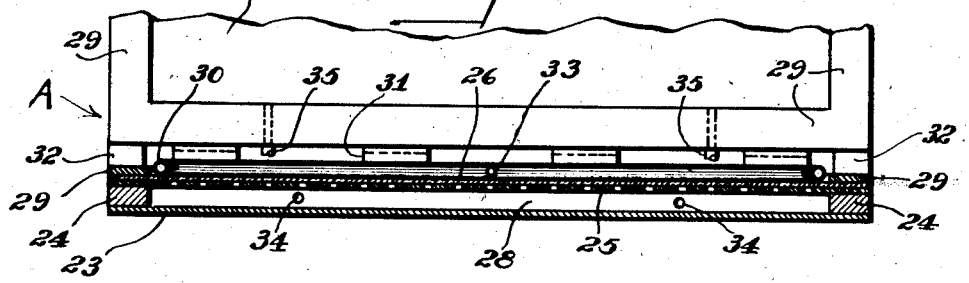
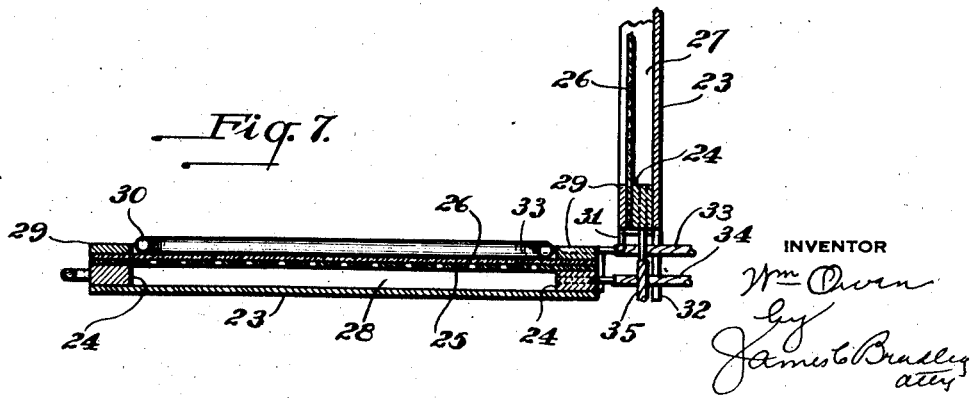

Patented Jan. 24, 1928.

1,657,227

UNITED STATES PATENT OFFICE.

WILLIAM OWEN, OF PITTSBURGH, PENNSYLVANIA, ASSIGNOR TO PITTSBURGH PLATE GLASS COMPANY, A CORPORATION OF PENNSYLVANIA.

APPARATUS FOR MAKING COMPOSITE GLASS.

Application filed March 10, 1927. Serial No. 174,184.

Figure 1:
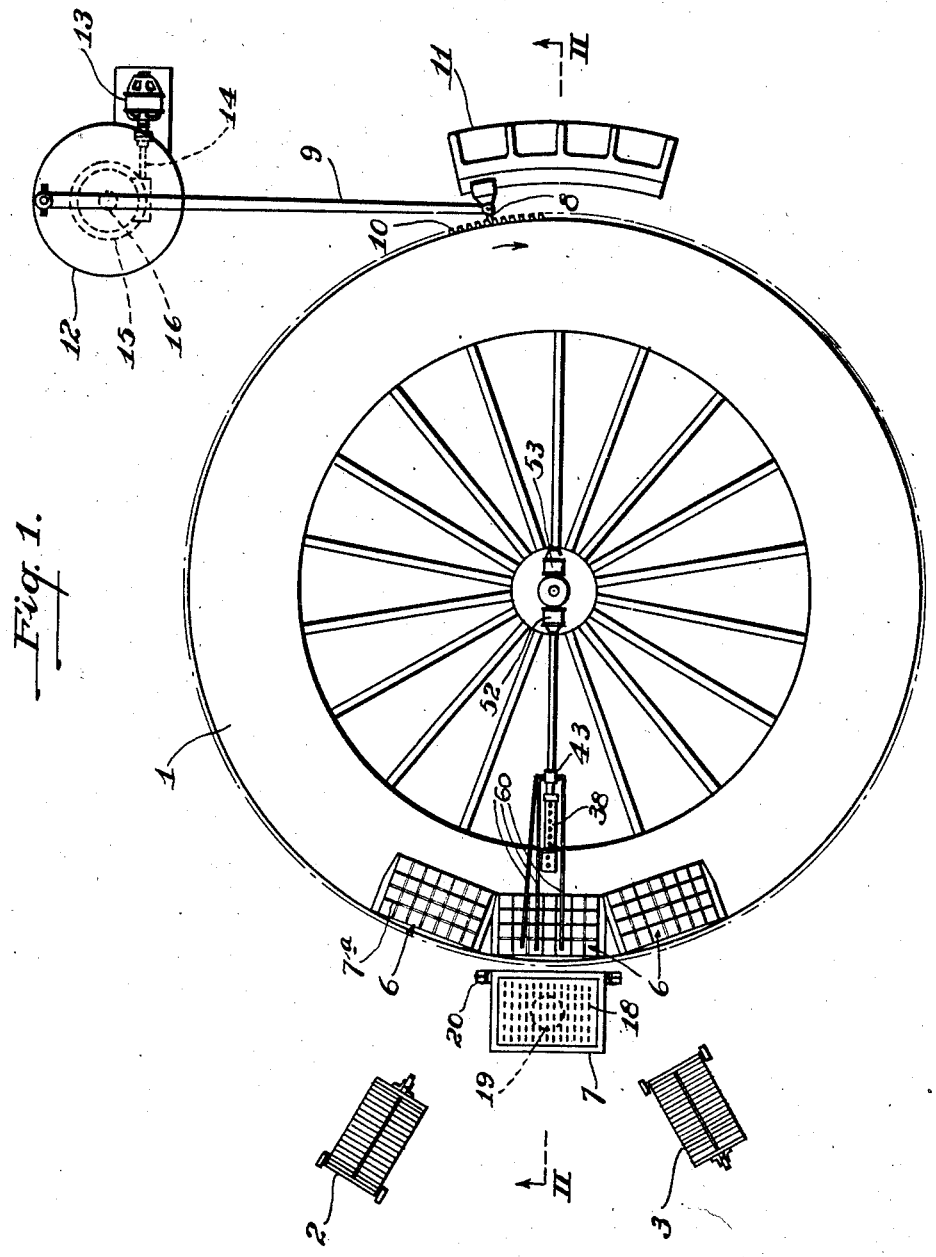
Figure 2:
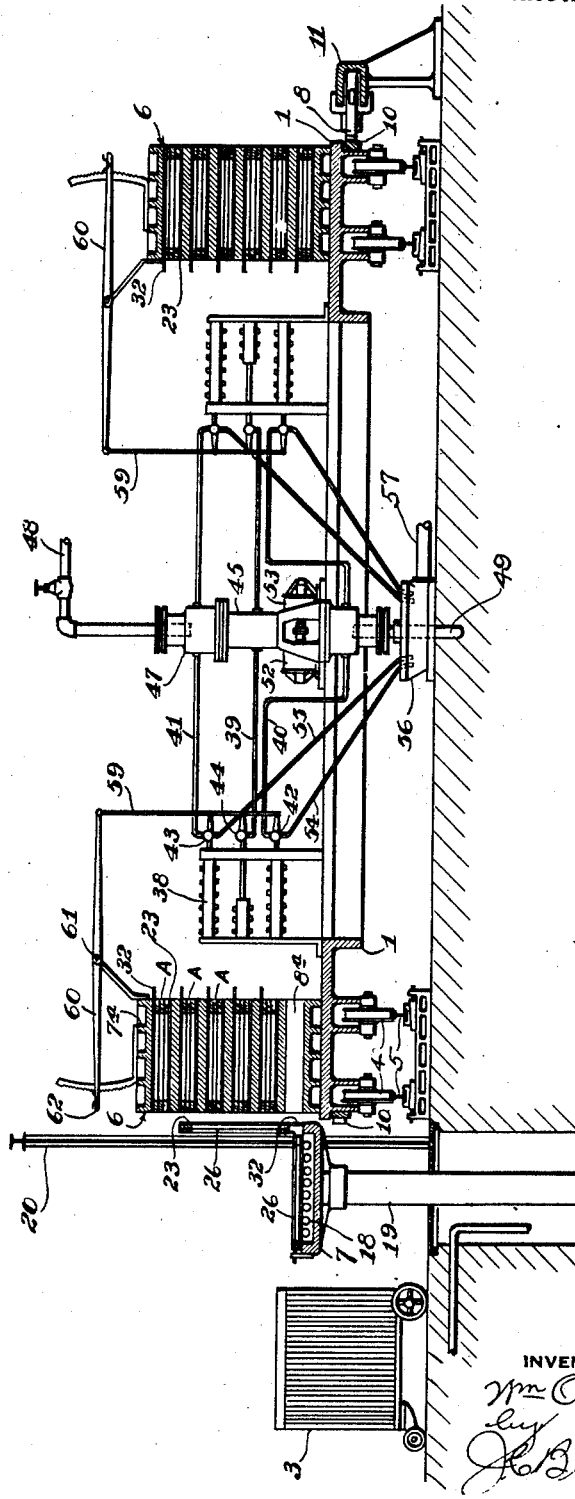
Figure 3:
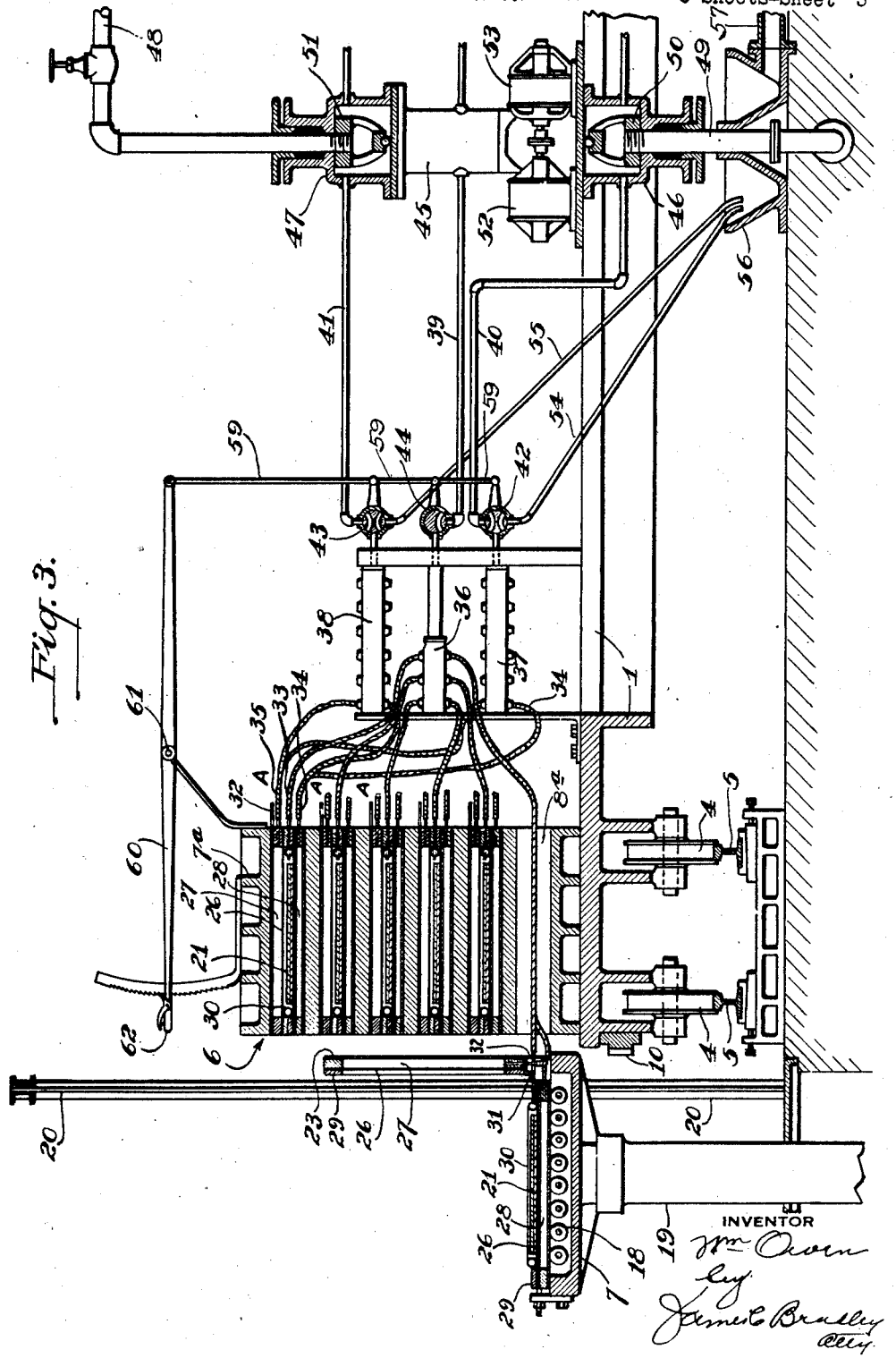
Figure 4:
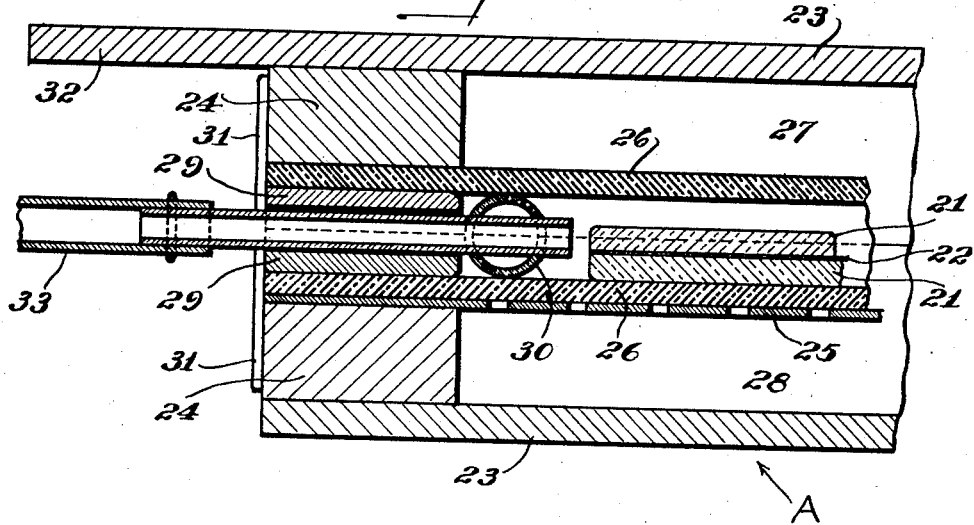
Figure 8:
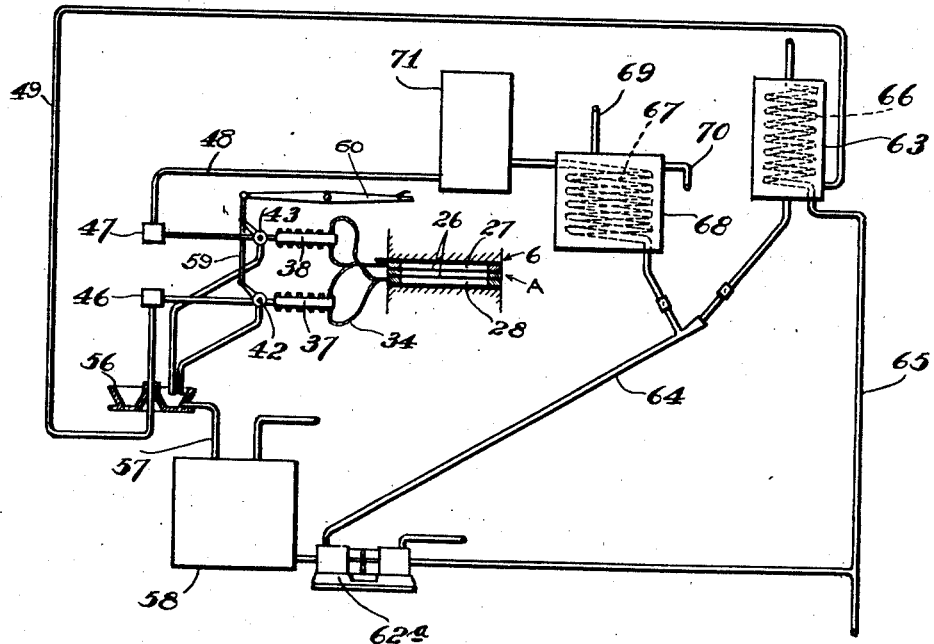

The invention relates to apparatus for making composite glass, and particularly to the means for applying heat and pressure to cause the joinder between the glass and celluloid. Composite glass ordinarily comprises two sheets of glass with a sheet of celluloid cemented therebetween, although a greater or less number of layers of material may be employed. It is preferred to assemble the sheets with a coating of cement, such as gelatin, dried upon the surfaces of the glass sheets, which are to be cemented to the celluloid, the heat subsequently applied to the assembled sheets serving to soften the gelatin and secure adhesion when pressure is applied, but it will be understood that the apparatus may be used in other ways. For instance, a sufficient amount of heat and pressure will cause the adherence of the celluloid to the glass without the use of any cement, and the invention may be employed in such way, if desired. Heretofore, it has been the practice to assemble the set of sheets to be joined in a rubber bag or container, which is then placed in a tank and exposed to hydraulic pressure, the interior of the bag being open to the atmosphere, and the liquid which applies the pressure being heated to soften the gelatin. The object of the present apparatus is to provide a more convenient means for carrying out this procedure, so that the labor involved is less and the time required is reduced. This is accomplished by substituting for the rubber bags, pairs of rubber diaphragms between which the sets of plates to be joined are placed, and by providing for a multiple pressing and heating operation. Certain embodiments of the invention are illustrated in the accompanying drawings, wherein:

Figure 1 is a partial plan view of the apparatus. Fig. 2 is a section on the line II—II of Fig. 1. Fig. 3 is a partial section on the line II—II of Fig. 1, but on an enlarged scale. Fig. 4 is a partial section through a pair of frames used and through the glass to be jointed in position between the frames. Figs. 5, 6 and 7 are detail views of one of the presser members, Fig. 5 being a plan view with the presser member open, and Figs. 6 and 7 being sections on the lines VI—VI and VII—VII, respectively, of Fig. 5. And Fig. 8 is a diagrammatic plan view showing the arrangement for supplying hot and cold water under pressure to the various pressure chambers.

In carrying out the operation, the sheets of glass and celluloid to be joined together to form the composite plates are brought to a position adjacent the turntable 1 by means of the trucks 2 and 3 provided with suitable racks for supporting the sheets. The glass sheets as brought into position by the trucks are each coated on one side with a thin film of gelatin, which has dried thereon, but which is readily softened by the application of heat. The sheets are assembled in sets of three with the sheet of celluloid between the two sheets of glass, and the sheets as thus assembled are ready for the application of heat and pressure in the pressing apparatus, to which the invention is particularly directed.

The turntable 1 comprises a suitable framework carrying the wheels 4, 4 mounted on the pairs of parallel tracks 5, 5. Carried by the framework of the turntable are the series of cabinets 6, 6, 6, etc. each adapted to receive six sets of sheets to be joined together, the arrangement being such that each cabinet is brought opposite the loading table 7 by the intermittent rotation of the turntable. After each framework is loaded with the sets of sheets to be joined together, the turntable is moved ahead one step to bring another press framework into position, this loading operation continuing until all the frameworks 6 are filled or loaded. When one of the frameworks has made a complete revolution and arrives at the loading table 7, its contents are removed and a new set of sheets inserted, thus completing the cycle. The turntable is given its intermittent movement of rotation by means of a spring pressed dog 8 which is reciprocated back and forth by the connecting rod 9 and which engages the rack 10 secured around the periphery of the table. The dog is guided in its movement by the member 11 and the rod 9 is rotated by means of the crank disc 12, such disc being operated from the motor 13 through the intermediary of a worm on the shaft 14 of the motor which engages a worm wheel 15 carried by the axle 16 of the disc 12, The cabinets 6 are preferably in the form of steel castings stiffened at the top and bottom by means of the ribs 7ª and provided with a series of compartments 8ª arranged one above the other, as indicated in Fig. 3, and adapted to carry the six presser members A, A, A, etc., in which the composite sheets are heated and pressed. As indicated in Fig. 3, one of the presser members A has been withdrawn from its compartment and is in open position, thus permitting the insertion or removal of a set of sheets. In removing a presser member, the loading table 7 is brought into alignment with the compartment from which the presser member is to be removed and the presser member is then slid out upon the table, such table being provided with anti-friction rollers 18 to facilitate this movement. The table is preferably moved up and down by means of the hydraulic plunger 19, the operation of which is under the control of the operator from a suitable control valve (not shown) in the vicinity of the table. The table is guided in its vertical movement by means of the vertical guide 20 with which suitable devices, carried by the front of the table, engage. The use of this loading and unloading table involves a substantial advantage, as it greatly lessens the labor of handling the presser members A. These members are very strong and heavy to resist hydraulic pressure and their weight combined with that of the glass carried thereby is such that without the table, it would be a very difficult matter to remove the presser members from the cabinets and replace them therein.

The construction of the presser members will be understood by reference to Figs. 4 to 7, the two sheets of glass 21, 21 with the interposed sheet of celluloid 22 being shown in position for pressing in Fig. 4. Each presser member A is made up of a pair of separable frame members placed in opposition and each comprising a base plate 23 and a rectangular frame 24 brazed thereto. Brazed to the upper face of the lower frame 24 is a perforated plate 25. A pair of rubber diaphragms 26 close the opposing chambers 27 and 28, such diaphragms being vulcanized at their edges to the frame 24 and to the edges of the perforated plate 25. In opposition to the frames 24, 24 and acting as binding strips for the edges of the rubber diaphragms are the rectangular metal plates 29, 29 screwed to the frames 24, 24. A hollow rubber tube 30 extending around the periphery of the chamber lying between the diaphragms 26, 26 serves to act as a seal for this chamber. The two opposing frame members are hinged together along one edge by means of the hinges 31, the pintles of the hinges being relatively loose for the purposes as hereinafter set forth. One of the plates 23 is also provided with an extension 32, which serves as a stop when the frame member is swung open slightly past 90 degrees, as indicated in Fig. 3. When moved to this position, the projection 32 comes in contact with the edge of the table 7 so that the frame member is prevented from swinging further back. Since it is desirable to apply suction to the space between the diaphragms 26, 26 to permit the removal of air and excess cement from between the glass plates and the celluloid, a suction pipe 33 is preferably provided for each presser member, such pipe passing between the strips 29, 29 and through the rubber tube 30 which acts as a packing means therefor, the pipe being connected to a suitable exhaust system, as later described.

When the sheets 21, 22 have been positioned between the rubber diaphragms, as indicated in Fig. 4, the perforated plate 25 serves to prevent the lower diaphragm from sagging under the weight of the sheets, and at the same time, the perforations permit of the application of pressure to the entire lower surface of such diaphragm. In carrying out the pressing operation, water heated to a temperature of about 250 degrees Fahrenheit is supplied under pressure to the chambers 27 and 28, such pressure being preferably about 150 pounds per square inch. The heat of the water is conducted through the diaphragms and glass plates and serves to soften the cement, and the relatively high pressure serves to bring the surfaces to be cemented together into very intimate contact. If now the plates are permitted to cool down under pressure, a very effective cementing action is secured, and this cooling off operation is preferably facilitated by removing the hot water from the chambers 27 and 28 and substituting therefor cold water, the pressure heretofore specified being maintained during the substitution. During the application of this pressure, it is necessary that the plates 23, 23 be supported against distortion and this is accomplished by placing the presser members in the compartments 8ª, 8ª, 8ª, etc., of the cabinet 6. This requires, of course, that the frame members when in closed position, as indicated in Fig. 4 shall fit into the compartment 8ª with only a slight amount of clearance, as otherwise the plates 23, 23 would not be properly supported. The presser frames, therefore, are proportioned so that they fit very snugly into the compartments, but at the same time the fit is sufficiently loose to permit them to be easily shoved into position and removed therefrom. Due to the fact that there must be a slight clearance between the presser member and its compartment, the frame members will separate slightly during the application of hydraulic pressure to the chambers 27 and 28, and it is to permit this slight separation that the pintles in the hinges 31 have a relatively loose fit. It is under this condition that the use of the clamping strips 29, 29 becomes necessary or very desirable, as they secure the edges of the rubber diaphragms against separation from the frame members 24, 24 under the relatively heavy hydraulic pressure. Any slight separation of the presser members is prevented from causing a loss of vacuum from between the diaphragms by the flexible packing tube 30.

As indicated in Figs. 3, 4, 5 and 7, each of the presser members 27 and 28 is provided with two connections 34 and 35, the connection 34 serving to supply hot water to the chamber and the connection 35 serving to supply cold water. These connections and also the pipe 33 leading to the space between the two diaphragms 26, 26 for applying suction are in the form of flexible hose members, as indicated in Fig. 3 in order to permit the withdrawal to the front of the cabinet 6 of the presser members without the necessity of disconnecting any of the supply pipes. Each of the suction pipes 33 leads to a vacuum header 36 (Fig. 3) while the pipes 34 and 35 lead respectively to the hot water header 37 and the cold water header 38. These headers are connected to the pipes 39, 40 and 41, the pipes 40 and 41 being provided with the three-way valves 42 and 43, while the pipe 39 is provided with a two-way valve 44. The pipe 39 leads to a vacuum tank 45, while the pipes 40 and 41 are connected to the headers 46 and 47 located at the center of the turntable. The headers 46 and 47 are supplied from the pipes 48 and 49, which have swivelling connections at 50 and 51 with the headers 46 and 47. The vacuum tank is exhausted by means of the pump 52 operated by the motor 53. Leading from the three-way valves 42 and 43 are the drain pipes 54 and 55, such pipes discharging to a trough 56 from which a pipe 57 leads to the drain tank 58 (Fig. 8).

The three valves 42, 43 and 44 have their handles connected to the rods 59, 59, 59 operated by the levers 60, 60, 60 pivoted at 61 and having handles 62, 62, 62 in convenient position for actuation by the operator of the machine. When the valve 42 is moved counter-clockwise about 45 degrees, and the valve 43 is moved clockwise a similar amount, hot water from the pipe 40 and header 37 is circulated to the presser chambers 27 and 28 and thence through the header 38 and valve 43 to the drain pipe 55. This circulation is continued until the plates between the diaphragms 26, 26 are heated to about 250 degrees F., when the valve 43 is moved to closed position again, and a pressure of about 150 pounds per square inch is accumulated in the chambers 27 and 28. During this period the valve 44 is opened and suction is applied to the spaces between the diaphragms 26, 26 to facilitate the removal of air and any excess gelatin from between the plates.

It is now necessary to cool the composite plates down under pressure, and this is accomplished by turning the valve 43 counter-clockwise to full open position, and the valve 42 clockwise to partially open drainage position. This maintains the pressure in the chambers 27 and 28, but permits the incoming cold water from the pipe 41 to displace the hot water in such chambers, such water flowing out through the drain pipe 54. The circulation of cold water through the chambers 27 and 28 is continued until the composite plates are cool enough for handling, at which time the valve 43 is moved to closed position and the valve 42 to full open drainage position, so that all the water in the chambers 27 and 28 flows out by gravity. All this is done while the turntable 1 is making its full revolution, so that each cabinet may be emptied at the loading table 7, at which time such cabinet is refilled, as heretofore described, thus completing the cycle.

The connections for heating and cooling the water supplied to the presser chambers will be seen by reference to Fig. 8, a number of the connections and parts there shown having already been referred to. Pressure is supplied to the system by means of the pump 62ª, the water being conducted under pressure to the tank 63 through the pipe 64. This tank is heated by means of the steam line 65, leading to the steam coil 66 located in the tank. The heated water from this tank is conducted to the hot water header 46 through the pipe 49 heretofore referred to. Water is also supplied from the pipe 64 to the coil 67 in the tank 68, and this water is cooled by circulating water from the inlet pipe 69 through the tank and out through the outlet 70. This requirement for cooling the water exists since the pump 62ª is supplied from the drain tank 58 and the water in this tank is at a relatively high temperature, since it is supplied by the drainage from the presser chambers 27 and 28. The water as cooled in the coil 67 passes to the tank 71 and thence through the cold water supply pipe 48 to the header 47 heretofore referred to, thus completing the cycle.

What I claim is:

1. Apparatus for applying pressure to a plurality of sheets to be joined together comprising a pair of opposing separable frame members having chambers facing each other, a flexible diaphragm seated across the open face of each chamber constituting a closure therefor, a supporting member or casing having a slot therein just wide enough to receive the frame members when they are fitted against each other, and means for supplying fluid under pressure to each of said chambers, the said diaphragms being adapted to receive between them the sheets to be joined together.

2. Apparatus for applying pressure to a plurality of sheets to be joined together comprising a pair of opposing separable frame members having chambers facing each other, a flexible diaphragm seated across the open face of each chamber constituting a closure therefor, a supporting member or casing having a slot therein just wide enough to receive the frame members when they are fitted against each other, and means for supplying fluid under pressure to each of said chambers, the said diaphragms being adapted to receive between them the sheets to be joined together, an exhaust passage being provided leading outward from the space between the diaphragms.

3. Apparatus for applying pressure to a plurality of sheets to be joined together comprising a pair of opposing separable frame members having chambers facing each other, a flexible diaphragm seated across the open face of each chamber constituting a closure therefor, a supporting member or casing having a slot therein just wide enough to receive the frame members when they are fitted against each other, packing means between the diaphragms adjacent the edges thereof, means for supplying fluid under pressure to each of said chambers, and means for exhausting the air from the space between the diaphragms.

4. Apparatus for applying pressure to a plurality of sheets to be joined together comprising a pair of opposing separable frame members having chambers facing each other, a flexible diaphragm seated across the open face of each chamber constituting a closure therefor, a supporting member or casing having a slot therein just wide enough to receive the frame members when they are fitted against each other, packing means between the diaphragms adjacent the edges thereof in the form of a hollow flexible tube, spacing or binding strips for the diaphragm edges carried by the frames outward of the tube, means for supplying fluid under pressure to each of said chambers, and means for exhausting the air from the space between the diaphragms.

5. Apparatus for applying pressure to a plurality of sheets to be joined together comprising a pair of opposing separable frame members, hinged together and having chambers facing each other, a flexible diaphragm seated across the open face of each chamber constituting a closure therefor, a supporting member or casing having a slot therein just wide enough to receive the frame members when they are closed against each other, and means for supplying fluid under pressure to each of said chambers, the said diaphragms being adapted to receive between them the sheets to be joined together.

6. Apparatus for applying pressure to a plurality of sets of sheets to be joined together comprising a plurality of pairs of opposing separable frame members having chambers facing each other, a flexible diaphragm across the open face of each chamber constituting a closure therefor, an upright metal cabinet having therein a series of horizontal slots or compartments one above the other, and each just wide enough to receive a pair of the frame members when they are fitted together, and connections for supplying fluid pressure to each of said chambers.

7. Apparatus for applying pressure to a plurality of sets of sheets to be joined together comprising a plurality of pairs of opposing separable frame members having chambers facing each other, a flexible diaphragm across the open face of each chamber constituting a closure therefor, an upright metal cabinet having therein a series of horizontal slots or compartments one above the other extending through the cabinet and each just wide enough to receive a pair of the frame members when they are fitted together, fluid pressure supply means on the rear side of the cabinet, and flexible connections therefrom to each of said chambers, permitting the pairs of frame members to be removed forwardly from said slots in the cabinet without unfastening said connections.

8. Apparatus for applying pressure to a plurality of sets of sheets to be joined together comprising a plurality of pairs of opposing separable frame members having chambers facing each other, a flexible diaphragm across the open face of each chamber constituting a closure therefor, an upright metal cabinet having therein a series of horizontal slots or compartments one above the other, and each just wide enough to receive a pair of the frame members when they are fitted together, connections for supplying fluid pressure to each of said chambers, a loading table mounted for vertical movement in front of said cabinet so that it may be brought into position opposite each of said slots or compartments, and means for moving the table vertically.

9. Apparatus for applying pressure to a plurality of sheets to be joined together comprising a pair of opposing separable frame members having chambers facing each other, a flexible diaphragm seated across the open face of each chamber constituting a closure thereof, spacing or binding strips lying over the edges of the diaphragms and secured to said frame members, a supporting casing having a slot or compartment therein just deep enough to receive the frame members when they are fitted against each other, and means for supplying fluid under pressure to each of said chambers, the said diaphragms being adapted to receive between them the sheets to be joined together.

In testimony whereof, I have hereunto subscribed my name this 9th day of March, 1927.

WILLIAM OWEN.